Sept. 17, 1935.  C. MACKINTOSH  2,014,392
PLANT DUSTING MACHINE
Filed April 11, 1932  4 Sheets-Sheet 1
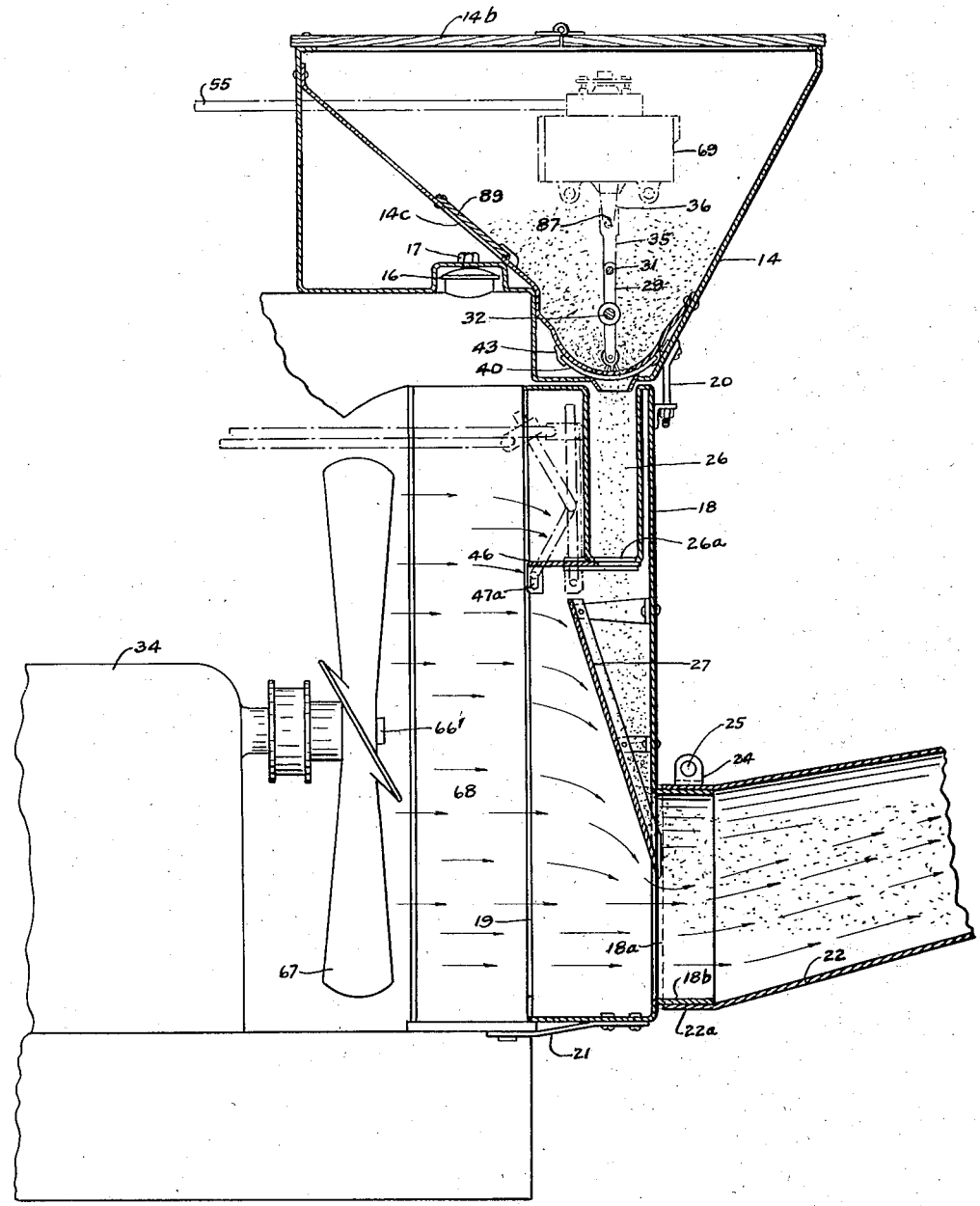
INVENTOR
CHARLES MACKINTOSH
BY
Geo. F. Bailey
ATTORNEY

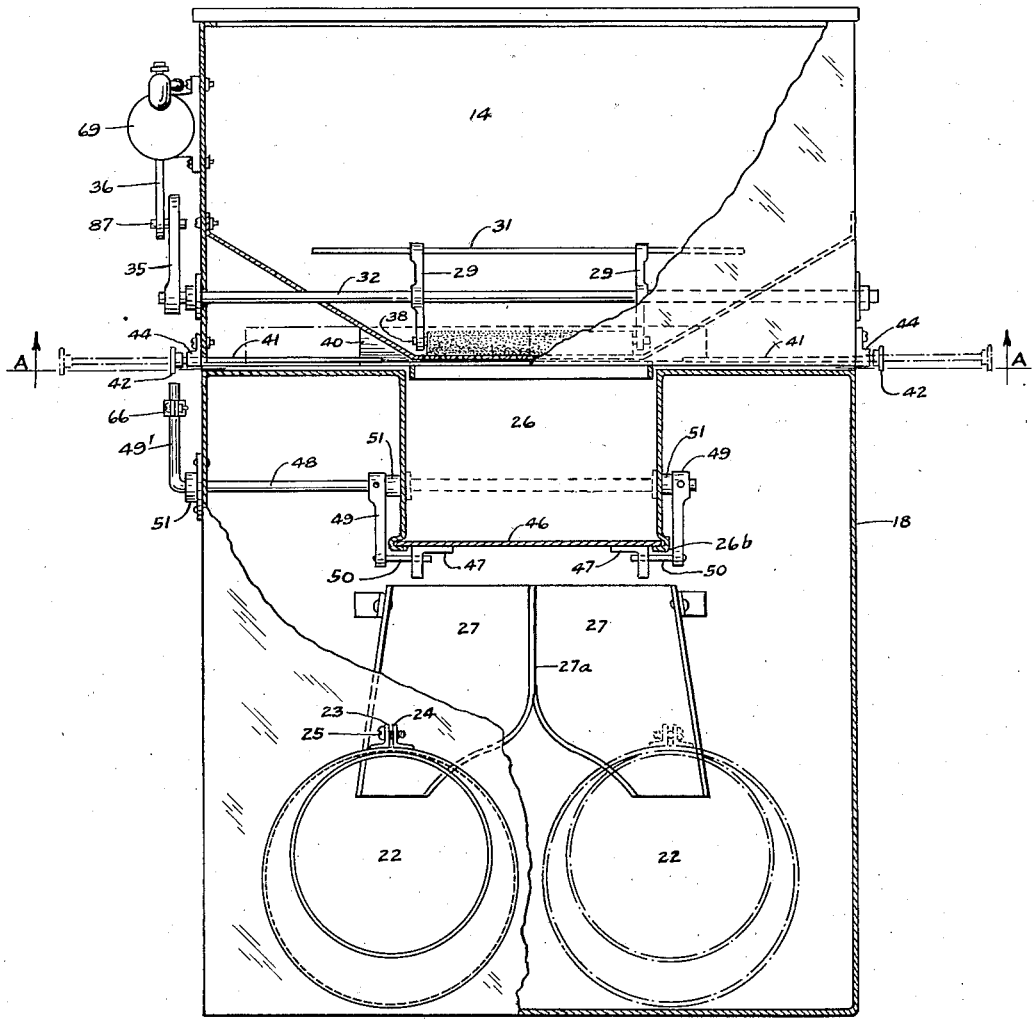

Sept. 17, 1935. C. MACKINTOSH 2,014,392
PLANT DUSTING MACHINE
Filed April 11, 1932 4 Sheets-Sheet 3
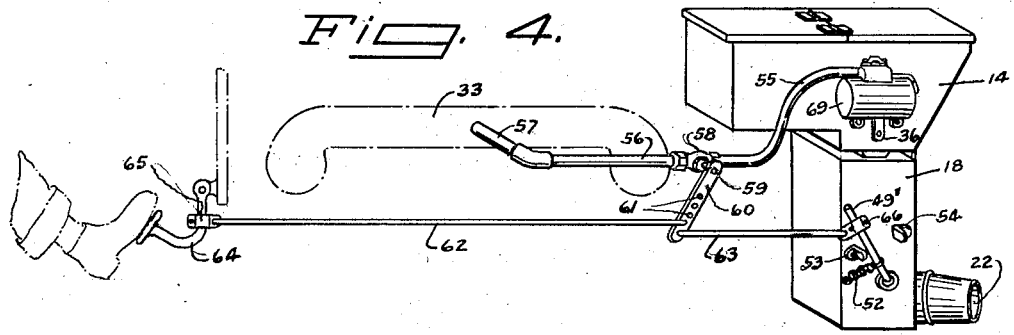
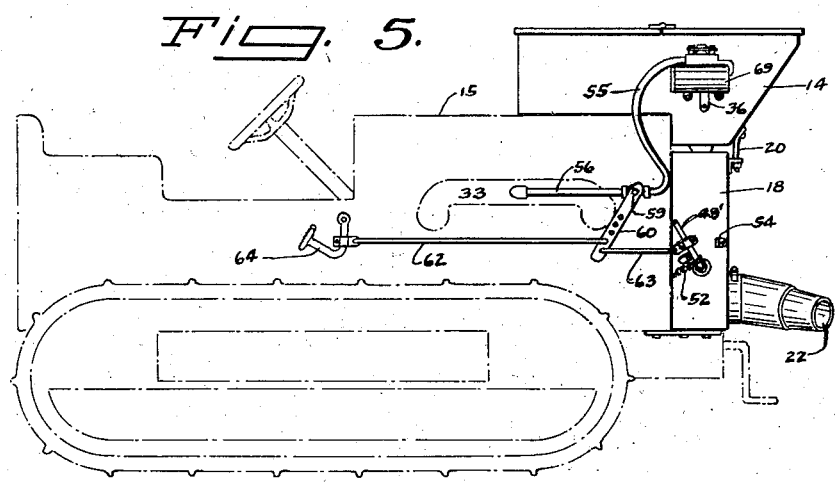
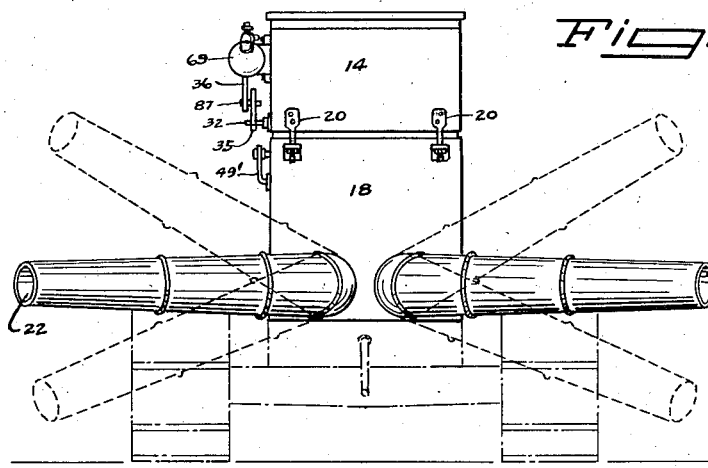
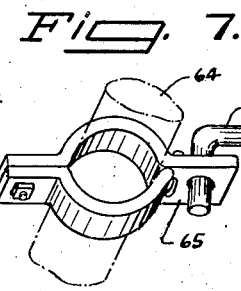
INVENTOR
CHARLES MACKINTOSH
BY
Geo. F. Bailey
ATTORNEY Sept. 17, 1935.  C. MACKINTOSH  2,014,392
PLANT DUSTING MACHINE
Filed April 11, 1932  4 Sheets-Sheet 4

INVENTOR
CHARLES MACKINTOSH
BY
Geo. F. Ballay
ATTORNEY

Patented Sept. 17, 1935

2,014,392

UNITED STATES PATENT OFFICE 2,014,392

PLANT DUSTING MACHINE

Charles Mackintosh, Ukiah, Calif.; Effie Mackintosh, executrix of said Charles Mackintosh, deceased, assignor of one-half to Frank A. McDonald, San Francisco, Calif.

Application April 11, 1932, Serial No. 604,522

11 Claims. (Cl. 43—148)

This invention relates to a certain new and useful improved machine that is to be used for the purpose of dusting sulphur or other dry chemicals or compounds on plants of various types and also on all types of trees where such dusting is required. The device can also be used for sowing seed.

The invention particularly relates to a machine of the character described to be used in dusting vineyards and other types of plants that are planted in rows.

Various kinds of dusting machines have been provided for dusting plants, all of which have certain disadvantages. Manually operated machines have been provided, but are very slow and inefficient and require much manual labor in their operation, which therefore, makes the dusting process very expensive. Mechanically operated dusting machines have also been provided and all require a trailer and a motor for operating same. The trailer is drawn through the vineyard or orchard by a tractor or other suitable motor vehicle. That type of machine requires at least two men to operate, one for driving the tractor and the other for handling the trailer and dusting machine. That type of machine is also very expensive to manufacture, due to the fact that the farmer must buy a trailer and gas engine as well as the dusting machine.

As every farmer has a tractor or some other type of motor vehicle, it is an object of the present invention to provide an especially constructed dusting machine of the character described and to mount same directly on the tractor or motor vehicle in such a manner as to enable the dusting machine to be operated by the same motor that operates the tractor or other vehicle upon which the dusting machine is mounted.

It is another object of the invention to mount the said dusting machine on the front portion of the motor vehicle and to arrange a portion of the dusting machine in front of the radiator of the motor vehicle, in such a manner as to enable the same fan that is used to cause air to pass through the radiator to be also used simultaneously to blow the dust out of the machine.

It is another object of the invention to invert the radiator fan and to blow the air through the radiator instead of drawing it through and to thereby blow the same air through the dusting outlets of the machine. Dusting material that will fume when heated, such as sulphur or nicotine, will be fumed by the air heated by the engine and the radiator, and this same air conveys the material.

It is another object of the invention to provide an agitator in the container that holds the sulphur, to keep the sulphur loose therein, and to preferably operate said agitator by a vacuum motor that is connected to the manifold of the motor that propels the vehicle upon which the dusting machine is mounted.

It is another object of the invention to provide a shutter for enabling the sulphur to be dispensed out of the container, and to provide means for opening and closing said shutter from the footboard of the motor vehicle.

It is another object of the invention to provide means for opening said shutter and starting said vacuum motor, that is provided to operate the sulphur agitator, simultaneously.

It is another object of the invention to provide means for adjusting the amount of sulphur that can be discharged out of the dusting machine.

It is another object of the invention to provide adjustable discharge outlets on the dusting machine to enable the dust to be discharged at different heights and in different directions.

It is another object of the invention to construct the said agitator in such a manner as to cause it to force the required amount of sulphur out of the container and at the same time automatically keep the sulphur loose within the container.

The invention further consists in the particular combination, construction and association of the different parts, such as described in the following specification, and possesses various other objects and features of advantage, some of which, with the foregoing, will be made manifest in the following description of the preferred form of the invention that is illustrated in the drawings accompanying and forming part of the specification.

It is to be understood that it is not intended to limit the invention to the embodiment shown by said drawings and description, as variations may be adapted within the fundamental principle of the invention as set forth in the claims.

In the accompanying drawings:

Figure 1 is a vertical sectional view of one type of device involving the invention and shows the device arranged on and in front of the radiator of a motor vehicle, and illustrates how the radiator fan may be utilized for blowing air through the radiator and dust out of the dusting machine.

Figure 2 is a partial sectional and front plan view of the device and shows one method of arrangement of the different parts, looking from in front of the machine.

Figure 3 is a fragmentary sectional view illustrating how the machine is fastened to the radiator cap of the motor vehicle.

Figure 4 is a perspective view of the dusting machine and shows the vacuum motor connected to the manifold of the motor that operates the vehicle, and also illustrates one method that may be used for starting the vacuum motor and opening the discharge shutter, from the footboard of the motor vehicle.

Figure 5 is a side elevational view of the dusting machine and illustrates the preferred position that the machine is mounted on a tractor and illustrates how the operator of the tractor will always have a full view of the workings of the dusting machine.

Figure 6 is a front view of the machine and illustrates how the dust discharge outlets may be adjusted to cause the dust to be blown at different heights and in different directions.

Figure 7 is a perspective view of a clamp that is constructed to be adjustably connected to a foot pedal and pivotally connected to a rod that is connected to the discharge shutter and the vacuum motor starting mechanism.

Figure 8:
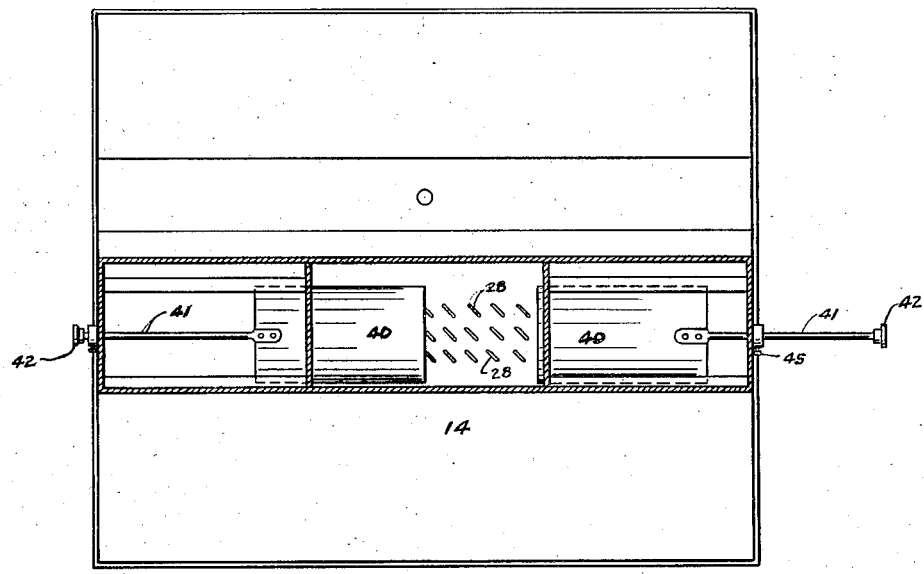
Figure 8 is a sectional view taken through lines A—A of Figure 2 and shows certain adjustable means that is provided to regulate the amount of sulphur dust that can pass out of the container.
Figure 9:
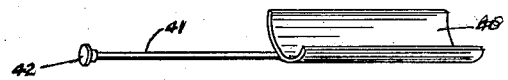
Figure 9 is a perspective veiw of one of the sliding covers that is provided to regulate the said amount of sulphur dust that can pass out of the container.

Referring in detail to the different parts wherein like reference numerals designate like parts throughout the several views, the numeral 14 designates a container that is preferably made out of sheet metal and is preferably formed with its front and rear sides tapering downwardly, as shown in Figure 1, and is made of a size to hold a suitable amount of sulphur dust or other dry compound that may be used for dusting. The said container is made of a shape that will enable it to be mounted on top of the radiator hood 15, as shown in Figure 5, and is preferably held thereon by being fastened to the radiator cap 16, as shown in Figures 1 and 3. A suitable stud or bolt 17 is provided to hold the said container substantially fastened to the cap.

Another housing 18 is provided and is detachably fastened to the said container 14 and is arranged directly in front of the radiator, as shown in Figures 1 and 5, and is made of a shape that will conform with the front shape of the radiator. However, the said housing 18 may be made in any suitable shape and a plate having certain openings therein may be used to cover the front of the radiator. This plate is designated by the numeral 19 and may be made in different sizes to suit the particular machine upon which the device is mounted. This will enable one size and shape of housing 18 to be used in connection with different types of motor vehicles, the only different part necessary being a different shaped plate 19. However, the device may be made with or without the plate 19. The housing 18 is detachably fastened to the container 14 by means of the straps 20 and the brace 21, which are preferably held fastened by suitable nuts or screws as illustrated. An opening 18a is provided on each side of the front face of the housing 18, as shown in Figures 1 and 2. The said openings are preferably formed with a cylindrical wall 18b as shown in Figure 1, and a discharge outlet tube 22 is adjustably and detachably mounted on each cylindrical wall 18b, of each opening 18a, as shown in Figures 1 and 2. The outlet tubes 22 may be made in any suitable size or shape but are preferably formed tapered, as shown in Figure 6, and the main portion of the tube extends at an angle from the elbow portion 22a that fits around the cylindrical wall 18b. This construction enables the tubes to be readily adjusted to discharge the dust at different heights. It will readily be seen that when the elbow portion of each tube is turned around its respective cylindrical wall 18b provided around each opening 18a, the discharge outlet tubes 22 will be adjusted to different heights, due to the fact that the tubes extend at an angle from the elbow portion that fits around the cylindrical wall 18b. The elbow portion 22a of each tube is split and two angular shaped members 23 and 24 are fastened on the elbow portion, as shown in Figure 2. A set screw 25 is threaded through the two members 23 and 24 and is provided to tighten the elbow portion of the tube around the cylindrical wall 18b. This construction merely illustrates one method used to adjustably and detachably hold the discharge tubes on the outlets of the housing 18.

Any suitable method may be provided to convey the dust from the container 14 to the discharge outlet tubes. A preferred method is shown in Figure 1 and consists in providing a guideway 26 in the housing 18 and in providing a chute 27 that leads from underneath the said guideway to the top portions of the discharge outlets 18a, as shown in Figure 1. The chute 27 may be made in any suitable shape and out of any suitable material, but is preferably made out of sheet metal and is substantially riveted within the housing 18 and is provided with a partition 27a, as shown in Figure 2, to convey the dust equally to each of the outlets 18a. The bottom of the housing 14 is provided with a plurality of openings 28 that are preferably made in the form of slots, as shown in Figure 8. It will thus be seen that the dust will pass through the said openings 28 and through the guideway 26 to the chute 27 where it will be conveyed to and through the outlets 18a and into the discharge outlet tubes 22.

Figure 10:
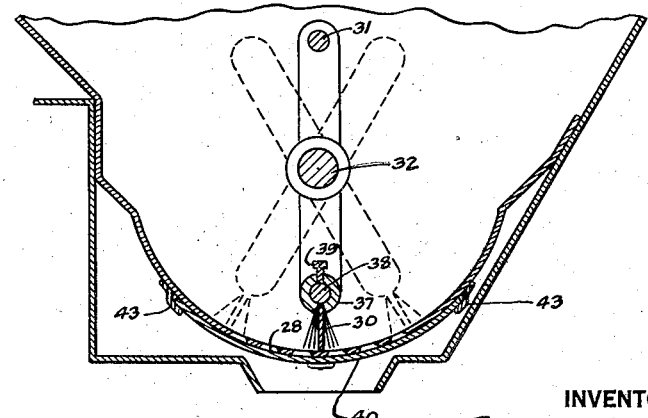
Figure 10 is an enlarged sectional view of the lower portion of the dust container and shows one type of agitator that may be used to agitate the dust and force same out of the container.

It is necessary to agitate the dust in the container 14 to prevent it from packing therein, and it is also necessary to provide some positive means to force the dust out of the openings 28 provided in the bottom of the container. A preferred means for accomplishing the above results is shown in Figures 1 and 2 and consists in pivotally mounting a pair of arms 29 within the container 14 and providing a scraper or brush 30 on the lower end of said arms, that is adapted to force the dust out of the openings 28 when the arms are oscillated, and in providing a rod 31 on the top portion of the arms, that is adapted to agitate the dust and cause it to move to the openings 28 provided in the bottom of the container 14. The said arms 29 are fixed on the shaft 32 that is revolubly mounted in the container 14 and is arranged across the container, as shown in Figure 2. Any suitable means may be provided for oscillating the shaft 32 to operate the agitator. A preferred method, however, is to operate the agitator by a standard vacuum motor that is connected to the manifold of the motor that operates the tractor. The numeral 33 designates the manifold and 34, the tractor motor. The shaft 32 extends out of the container 14, as shown in Figure 2, and is provided with a lever 35 that is substantially fixed thereon. The upper part of the lever 35 is connected to the vacuum motor lever 36 and as the said vacuum motor lever 36 oscillates, when the vacuum motor is operated, it will readily be seen that the lever 35 will be caused to oscillate and as the said lever 35 is fixed to the shaft 32, which is pivotally mounted in the container 14, the scraper brush 30 and the agitating rod 31 will be oscillated. In other words, the brush will be caused to move back and forth across the openings 28, provided in the bottom of the container 14, and the rod 31 will be caused to move back and forth to loosen the dust and move same to the bottom of the container where it will be forced out of said openings. Any suitable scraper or brush or the combination of the two, as illustrated, may be used to move the dust out of the openings 28. The present illustration consists in providing a metal blade and also a plurality of bristles and fastening the combination to a tube 37 that is mounted on a shaft 38 that is fixed to the arms 29, as shown in Figures 2 and 10.

A preferred means that is provided to regulate the amount of dust that can be dispensed out of the container 14, consists in providing two slidable covers 40 that are constructed to conform with the shape of the bottom of the container 14 and are slidably mounted across said bottom and are adapted to be moved across the openings 28 provided through the said bottom of the container 14. Each of the said covers 40 is fixed on a rod 41, and each rod 41 is provided with a handle 42 that extends beyond the outer side walls of the container 14. Suitable guides 43 are provided to slidably support the covers 40 on the bottom of the container 14. A plurality of bearings 44 are provided to slidably support the rods 41, and set screws 45 are provided to lock said rods 41 and hold the covers 40 in different locked positions. Figure 2 shows one of the covers moved out to its furthermost outer position and the other cover moved in to its innermost position. The covers can thus be moved in or out to different distances from each other, and it will therefore be seen that the closer they are together, the less will be the amount of dust that can be dispensed out of the container, and the further that the covers are moved apart, the greater will be the amount of dust that can be dispensed out of the container. Any other suitable method may be used to regulate the volume of dust that can be dispensed out of the container.

As hereinbefore stated, one of the objects of the invention is to provide a shutter that is adapted to permit the dust to be conveyed to the discharge outlet tubes, and to provide means for operating the said shutter from the footboard of the motor vehicle, and to also provide means to operate the said shutter in synchronism with the starting of the vacuum motor so that the shutter will open simultaneously with the starting of the agitator that is provided to move the dust out of the container. The bottom of the said guideway 26 is provided with an opening 26a, as shown in Figure 1, and a sliding cover or shutter 46 is provided to open and close said opening 26a. The bottom of the guideway 26 is formed as shown at 26b to provide suitable guideways for slidably supporting the shutter 46. Angular members 47 are fixed on the bottom of the said shutter, as shown in Figure 2, and a slot 47a is provided through the vertical sides of the said angular members, as shown in Figure 1. A suitable means for connecting the said shutter to the means that is provided for operating same from the footboard of the motor vehicle, consists in providing a shaft 48 and revolubly mounting same in the housing 18 and across the guideway 26, and in fixing a pair of arms 49 on said shaft, and in providing a pin 50 on each of said arms, as shown in Figure 2. It will be noted that each pin 50 extends into one of the slots 47a that are provided in the angular members 47 that are fixed on the bottom of the shutter 46. From the foregoing it will be seen that when the shaft 48 is turned in a certain direction, the shutter 46 will be moved over and, likewise, when the shaft 48 is turned in another direction, the shutter 46 will be caused to close. Numerals 51 designate suitable bearings that are provided to revolubly support the shaft 48 in the housing 18. The outer end of the shaft 48 is bent to form a lever 49', as shown in Figure 2. A clamp, similar to that shown in Figure 7, is provided on the said shaft lever 49. A coiled spring 52, as shown in Figure 4, is provided to resiliently hold the shutter closed. Numerals 53 and 54 designate two angle members that are fastened on the outer side wall of the housing 18 and are provided to form stops to limit the movement of the shaft lever 49. The coiled spring 52 exerts a pulling force on the shaft lever 49 and will hold it against the stop 53 unless force is applied against the lever to push it against the stop 54. When the shaft lever is against the stop 53, the shutter is in its closed position and when the lever is against the stop 54, the shutter is in its open position.

The preferred method of construction that is provided for starting the vacuum motor and opening the shutter in synchronism, is shown in Figures 4 and 5. Numerals 55, 56 and 57 designate a plurality of pipes that lead from the vacuum motor 69 to the manifold 33 of the tractor motor. These pipes may be ordinary tubing or any suitable air conveying means that will serve the purpose of the invention. The numeral 58 designates a butterfly valve that is provided between the pipes 55 and 56. The numeral 59 designates the butterfly valve handle and the numeral 60 a lever that is fixed to said handle. The numeral 61 designates a plurality of holes that are provided through the lever 60. Numerals 62 and 63 designate two rods, one of which leads from the lever 60 to the foot pedal 64 that is provided on the footboard of the motor vehicle, and the other to the shaft lever 49 that is connected to the shutter 46. Numerals 65 and 66 designate two clamps that are constructed as shown in Figure 7. It will be seen that one of these clamps is mounted on the shaft lever 49 and the other on the foot pedal 64. The rod 63 is pivotally connected to the said lever 60, that is fixed to the valve handle 59, and also to the clamp 66 that is fastened to the shaft lever 49. Likewise, the rod 62 is pivotally connected to the lever 60 and also to the clamp 65 that is fastened on the foot pedal 64. From the foregoing it will be readily seen that when pressure is applied to move the foot pedal, as shown dotted in Figure 4, the lever 60 will be moved and will open the valve 58 and the lever 49 will also be simultaneously moved to the stop 54 and will open the shutter 46. The moment that pressure is released from the foot pedal 64, the spring 52 will immediately pull the lever 49 against the stop 53 and will close the said shutter 46, and will also exert a pushing force against the rod 63 that will turn the valve rod 59 and close the valve 58. The valve 58 and the shutter 46 are thus operated in synchronism. This method of operating the shutter and vacuum motor is very advantageous, as it enables the driver of the tractor to be in complete control of the dusting at all times. It will be readily observed that the dusting can be easily started or stopped while the tractor is being driven by merely pressing the foot pedal or releasing the pressure therefrom.

Another important feature of the invention is inverting the radiator fan to enable the same fan that is used for forcing air through the radiator to be utilized for blowing the dust out of the duster. The numeral 66' designates the radiator fan shaft, the numeral 67 designates the radiator fan, and the numeral 68 designates the radiator. The pipes of the radiator are not shown, as it is desired to merely show the general outline to illustrate the principle of the invention. It will be particularly noted that the fan is inverted from the regular standard radiator fan, that is, it is constructed to blow air through the radiator rather than to draw air through. It will readily be understood that as much cooling will be produced by blowing the air through the radiator as is produced by drawing it through. The air will pass through all of the radiator pipes just the same and will finally pass out of the discharge outlet tubes 22 and will blow all the dust, that is conveyed into the said tubes, out of the tubes and thereby discharge the said dust on to the plants. The fan is entirely outside of the container 14 and all possibility of an explosion, as is common in sulphur dusters when the fan is within the container, is positively eliminated. The blades of the fan can be made any suitable shape and the speed of the fan run at any suitable number of revolutions to produce the necessary wind pressure, to properly blow the dust out of the discharge tubes. Another advantage of the present construction is that the air is warmed when it is blown through the radiator and warms the sulphur dust as it is blown on to the plants, which is a very desirable feature and produces the very best effects.

Any suitable vacuum motor may be provided to operate the agitator. I have indicated the vacuum motor generally at 69, and have shown the operating lever 36 of the motor connected to the lever 35 by the pin 87, see Figure 2. Since the vacuum motor may be of any standard construction, a further detailed description need not be given.

It is to be understood, however, that the agitator within the dust container 14 may be operated off of or by any other of the operating parts of the motor. For example, the agitator shaft could be connected to the fan shaft of the motor by a suitable arrangement of gears and operated from the fan shaft instead of the vacuum, the principal object being to operate the agitator and the shutter by a mechanism that is connected to and operated by the motor that operates the tractor.

The vacuum motor is preferably mounted on one side of the dust container, and it will be seen that the arrangement makes it very simple to connect the agitator to the vacuum motor lever. No gears or expensive construction of any kind are necessary. Likewise, there are very few parts to become worn. The construction, therefore, is not only inexpensive to manufacture, but also requires very little labor to keep the parts in repair. The numeral 14b designates a preferred type of cover that is provided on the container 14 and is hinged thereon in any suitable manner. An opening 14c is provided in the lower wall of the container to enable the operator to fasten or unfasten the screw 17 on the radiator cap 16. A cover 89 is provided over the said opening.

From the foregoing it will be seen that the invention is simple in construction and possesses many advantageous features. It can be mounted on and in front of the radiator of a tractor or other motor vehicle and very easily operated by the same motor that operates the vehicle. The device is always in front of the driver of the vehicle and is in complete control of the driver. It requires no additional labor to operate the device but can be operated by the driver by merely pressing the foot pedal 64 whenever it is desired to do any dusting. The device is particularly adaptable for use in dusting vineyards, as all that is necessary is to drive the tractor between the rows and the grape vines can be dusted automatically while the tractor is moving through the rows. The volume of sulphur or other dust that may be used can very easily be adjusted to suit different conditions, which is a very important feature, as at certain times it is necessary to provide considerable more dust on the plants than at other times. The device can also be used for discharging lime or other dry fertilizing materials on the ground. The providing of the device on the tractor and arranging it in front of the radiator thereof has several very important advantages. No additional motor or fan is required to operate the device. The cost of the motor alone would be more than the cost of the dusting machine. The saving is thus tremendous. Moreover, when sulphur is used for dusting, the heat from the engine 34 is used for causing the sulphur to fume before striking the plants. It will readily be seen that when the device is used for discharging lime and other dry fertilizing materials on the ground, the materials can be spread on the ground directly in front of the tractor when plowing, as the plows are fastened to the rear of the tractor. No additional labor is required to spread the said dry materials on the ground, as it can be done automatically with the plowing.

Having thus illustrated and described a certain form of construction and arrangement of parts pertaining to the invention, it is to be understood that the device can be built up in any suitable size or shape and mounted on the tractor or other motor vehicle in any suitable manner, the present illustration not being utilized as indicating the only form of construction and arrangement of parts into which the device can be made, and it is desired to include in this application for Letters Patent of the United States of America any and all patentable novelty that exists in the illustration and description disclosed and all that comes within the fundamental principle of the invention as set forth in the claims hereinafter mentioned.

I have found by actual test that the air passing through the radiator is 36° to 40° F. higher than the atmospheric temperature. Sulphur or other dusting material, such as nicotine, will fume at a temperature of 64° F. and the higher the temperature the better the fuming. Dusting is best done in the morning when there is little breeze due to the coolness of the atmosphere. The heat given off by the engine or radiator is sufficient to heat the air, passing through the radiator, to a temperature of at least 64° F. This heated air will convey the dusting material to the plants and will also cause the material to fume. It is the fuming of the material which kills the insects. Moreover the heated air will rise and will cause the fuming material to contact with the undersides of the leaves where the insects are most likely to be. If sulphur is not fumed and comes into contact with the vine stem, it will burn into the stem before the heat of the day will cause it to fume.

What is claimed:

1. A dusting device of the character described comprising a housing adapted to hold a quantity of dust, a plurality of discharge tubes for conveying the dust from said housing, means for securing the devices in front of the radiator of a motor vehicle, and means for blowing air through the radiator and into the discharge tubes to blow the dust out of the discharge tubes.

2. A dusting device of the character described comprising a housing having outlets and adapted to hold a quantity of dust, a plurality of discharge tubes for the housing, means for mounting the device on a motor vehicle, a shutter for controlling the passing of the dust from the outlets in said housing to the discharge tubes, an agitator for stirring the dust in said housing to force the dust out of said housing, a fan for blowing the dust out of the discharge tubes, said fan being operated by the same motor that operates the motor vehicle, means for operating said agitator, means for opening and closing said shutter, and means whereby the operating of the agitator is started in synchronism with the opening of the shutter and stopped in synchronism with the closing of the shutter.

3. A plant dusting device of the character described for use with a motor vehicle, said device comprising a housing having outlets and adapted to hold a quantity of dust, a plurality of discharge tubes for conveying the dust from the housing toward the plants that are to be dusted, a guide for conveying the dust from the opening in the bottom of said housing to the discharge tubes, a shutter in said guide, means for holding said device in front of the radiator of the motor vehicle so that air passing through the radiator will be used for conveying the dust, a fan provided on the fan shaft of the motor vehicle and adapted to blow air through the radiator and through the discharge tubes, an agitator for stirring the dust in said housing to force the dust out of the opening in the bottom thereof, a vacuum motor for operating said agitator, a tube leading from said vacuum motor to the manifold of the motor that operates the vehicle, a valve in said tube, and means for controlling said valve and said shutter from the driver's position on the vehicle.

4. A plant dusting device of the character described for use with a motor vehicle, said device comprising a housing having outlets and adapted to hold a quantity of dust, an opening in the bottom thereof for the dust to pass through, a plurality of discharge tubes for conveying the dust toward the plants that are to be dusted, a guide for conveying the dust from the opening in the bottom of said housing to the discharge tubes, a shutter in said guide, means for holding said device in front of the radiator of the motor vehicle so that air passing through the radiator will be used for conveying the dust, a fan provided on the fan shaft of the motor vehicle and adapted to blow air through the radiator and through the discharge tubes, an agitator for stirring the dust in said housing to force the dust out of the opening in the bottom thereof, a vacuum motor for operating said agitator, a tube leading from said vacuum motor to the manifold of the motor that operates the vehicle, a valve in said tube, a lever connected to said valve, means for connecting said lever to said shutter, means for simultaneously holding said valve and shutter resiliently closed, a foot pedal, and means connecting said foot pedal to said lever to enable said valve and shutter to be opened by pressing on said foot pedal.

5. A plant dusting device of the character described for use with a motor vehicle having a motor with an intake manifold, said device comprising a housing adapted to hold a quantity of dust, the bottom of said housing being formed concave, said bottom having a plurality of openings provided for the dust to pass through, a plurality of discharge tubes for conveying the dust toward the plants that are to be dusted, a guide for conveying the dust from the openings in said housing bottom to the discharge tubes, a shutter in said guide, means for resiliently holding said shutter closed, means for manually opening said shutter, a fan for blowing the dust out of said discharge tubes, an oscillating agitator for agitating the dust in said housing, said agitator having a blade that is adapted to move back and forth across the concave bottom of said housing and to force the dust out of the said openings therein, a vacuum motor for operating said agitator, a tube leading from the vacuum motor to the manifold of the motor that operates the vehicle, a valve in said tube, means for resiliently holding said valve closed, and means whereby said valve and shutter can be opened simultaneously and closed simultaneously.

6. The combination with a vehicle having a motor of the radiator type, of a dusting device mounted in front of the radiator in a position for receiving all of the air passing through the radiator and including a housing for the dust and discharge means leading therefrom, a fan operatively connected to the motor for blowing air through the radiator, all of the air passing through the radiator being received in the housing and passing through the discharge means for carrying the dust in the discharge means therewith.

7. The combination with a vehicle having a motor of the radiator type, a fan for forcing air through the radiator, and an intake manifold, of a dusting device and in a position for receiving all of the air passing theresthrough, and comprising a housing for the dust and discharge tubes communicating with the housing, vacuum means operatively connected to the intake manifold for feeding dust to the discharge tubes, said discharge tubes having openings for receiving all of the air that has been forced through the radiator, this air carrying the dust therewith as it passes through the tubes.

8. The combination with a vehicle having a motor of the radiator type, of a dusting device mounted in front of the radiator and including a housing for the dust and discharge means leading therefrom, said housing covering the entire front of the radiator, a fan operatively connected to the motor for blowing air through the radiator, all of the air passing through the discharge means for carrying the dust in the discharge means therewith, said means being adjustable for ejecting the dust in different directions.

9. The combination with a vehicle having a motor of the radiator type, a fan for forcing air through the radiator, and an intake manifold, of a dusting device connected to the radiator, and comprising a housing for the dust and discharge tubes communicating with the housing, said housing covering the entire front of the radiator vacuum means operatively connected to the intake manifold for feeding dust to the discharge tubes, said discharge tubes having openings for receiving all of the air that has been forced through the radiator, this air carrying the dust therewith as it passes through the tubes, said tubes being adjustable into different angles.

10. The combination with a vehicle having an internal combustion engine, a radiator, and a fan for causing air to flow over the engine and to pass through the radiator, of a dusting device for receiving the heated air from the radiator, and sulphur carried by the device and being ejected by the heated air, the heat of the air causing the sulphur to fume prior to contacting the plants.

11. The combination with a vehicle having an engine, a radiator, and a fan for drawing air from around the engine and for forcing it through the radiator where the air will be heated by coming into contact with the water carrying pipes, of a plant dusting machine disposed in front of the radiator and having outlet conduits through which the air from the radiator is forced, and means for continuously delivering dusting materials to the conduits where the heated air will carry the materials through the conduits and will also cause the materials to fume.

CHARLES MACKINTOSH.